(12) United States Patent (10) Patent No.: US 8,598,734 B2
Kusumi (45) Date of Patent: Dec. 3, 2013

(54) POWER SUPPLY SYSTEM AND VEHICLE EQUIPPED WITH THE SAME

(75) Inventor: Hidetoshi Kusumi, Nagoya (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 251 days.

(21) Appl. No.: 13/259,416

(22) PCT Filed: May 8, 2009

(86) PCT No.: PCT/JP2009/058662
§ 371 (c)(1),
(2), (4) Date: Sep. 23, 2011

(87) PCT Pub. No.: WO2010/128550
PCT Pub. Date: Nov. 11, 2010

(65) Prior Publication Data
US 2012/0032505 A1 Feb. 9, 2012

(51) Int. Cl.
*B60R 16/03* (2006.01)
(52) U.S. Cl.
USPC .......................................... 307/10.1; 903/902
(58) Field of Classification Search
USPC .................... 307/9.1–10.1; 320/104; 903/902
See application file for complete search history.

(56) References Cited

U.S. PATENT DOCUMENTS

| | | | | |
|---|---|---|---|---|
| 5,373,195 | A * | 12/1994 | De Doncker et al. | 307/45 |
| 7,430,089 | B2 * | 9/2008 | Suzuki et al. | 360/75 |
| 2003/0107352 | A1 * | 6/2003 | Downer et al. | 322/40 |

FOREIGN PATENT DOCUMENTS

| | | |
|---|---|---|
| JP | 6276609 A | 9/1994 |
| JP | 2003-209969 A | 7/2003 |
| JP | 2004-116296 A | 4/2004 |
| JP | 2007-295720 A | 11/2007 |
| JP | 2008-017661 A | 1/2008 |
| JP | 2008-253064 A | 10/2008 |

OTHER PUBLICATIONS

International Search Report mailed Jul. 28, 2009 of PCT/JP2009/058662.

* cited by examiner

*Primary Examiner* — Rexford Barnie
*Assistant Examiner* — Joseph Inge
(74) *Attorney, Agent, or Firm* — Kenyon & Kenyon LLP

(57) ABSTRACT

Converters are connected in parallel with each other to a pair of electric power lines. When required electric power required by a drive force generation unit is not more than a threshold value, a converter ECU causes a voltage converting operation of one of the converters that is associated with a power storage device of a higher output voltage to perform voltage converting operation, and causes the voltage converting operation of the other converter to be stopped, based on output voltages of the power storage devices detected by output voltage detection units. The first power storage device and the second power storage device are configured so that one of the power storage devices has a higher power supply voltage by a predetermined value than the power supply voltage of the other power storage device. The predetermined value is defined based on errors which may be included in detected values of the output voltage detection units.

9 Claims, 11 Drawing Sheets

WHEN Vb1>Vb2
Vb1o−Vb2o= R1·Is−R2·Is
= (R1−R2)Is

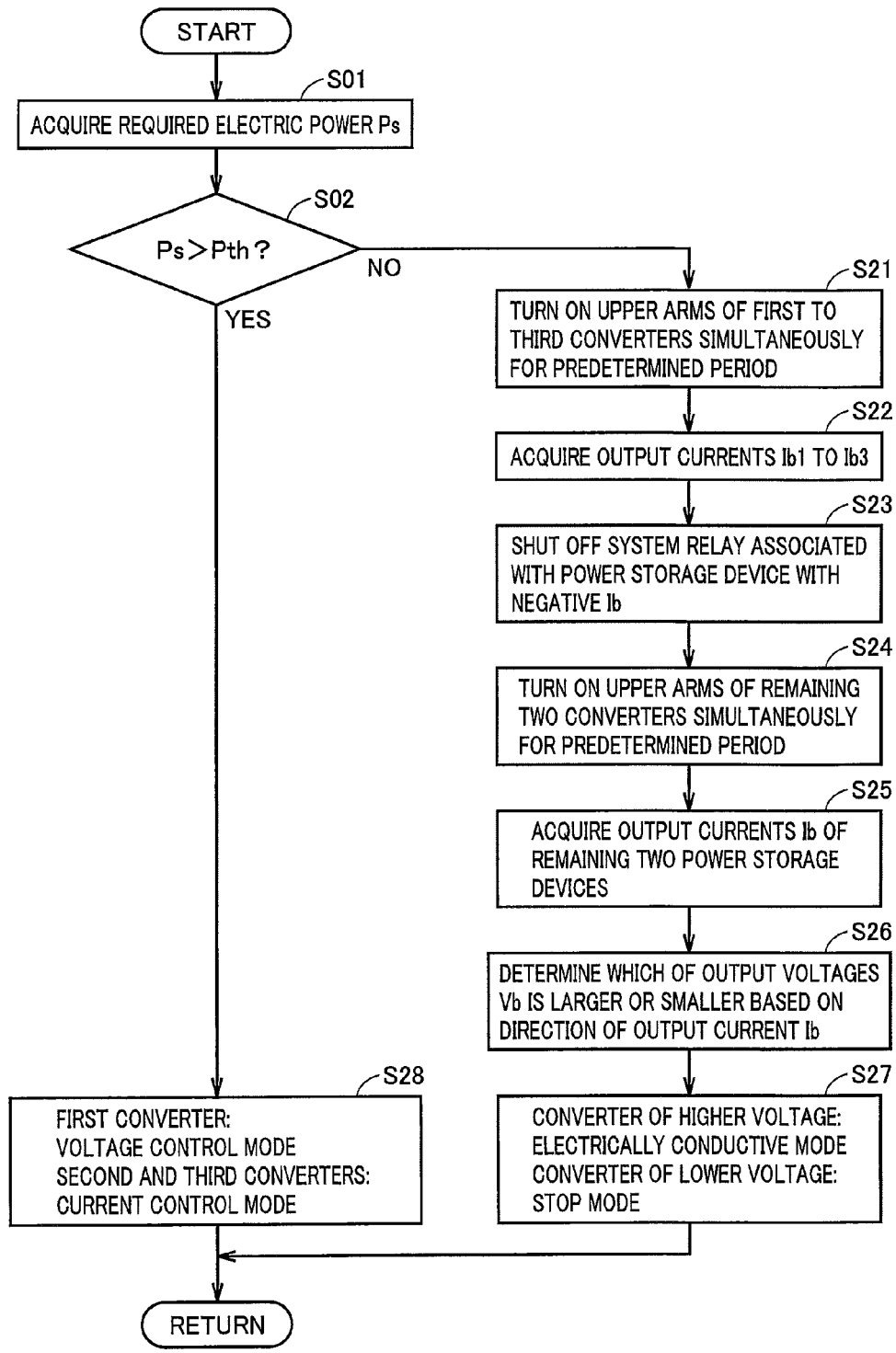

POWER SUPPLY SYSTEM AND VEHICLE EQUIPPED WITH THE SAME

This is a 371 national phase application of PCT/JP2009/058662 filed 8 May 2009, the contents of which are incorporated herein by reference.

TECHNICAL FIELD

The present invention relates to a power supply system having a plurality of power storage devices as well as a vehicle equipped with the power supply system, and particularly to a technique for reducing an electric power conversion loss of the power supply system.

BACKGROUND ART

Recently, in consideration of environmental issues, electrically powered vehicles driven by a force supplied from an electric motor, such as electric vehicle, hybrid vehicle, and fuel cell vehicle have been of interest. Such an electrically powered vehicle is mounted with a power storage device formed of a secondary battery, an electrical double layer capacitor or the like for supplying electric power to the electric motor and storing electrical energy into which kinetic energy is converted by regenerative braking.

For such a vehicle driven by a force supplied from the electric motor, it is desirable to have a greater charging/discharging capacity of the power storage device in order to enhance the acceleration performance and the travel performance such as mileage per charge. Accordingly, as a method for increasing the charging/discharging capacity of the power storage device, a configuration mounted with multiple power storage devices has been proposed. For example, Japanese Patent Laying-Open No. 6-276609 (Patent Literature 1) discloses an electric drive system having a plurality of (three for example) storage batteries each having a DC-to-DC converter interface between the storage battery and an inverter.

Further, Japanese Patent Laying-Open No. 2003-209969 (Patent Literature 2) discloses an electrical motor power management system providing a desired DC high voltage level to a high voltage vehicle traction system. This electrical motor power management system includes a plurality of power supply stages each having a battery and a boost/buck DC-to-DC converter and connected in parallel for supplying DC power to at least one inverter, and a controller controlling a plurality of power supply stages so that batteries of a plurality of power supply stages are equally charged and a plurality of power supply stages maintain a battery voltage to at least one inverter.

CITATION LIST

Patent Literature

PTL 1: Japanese Patent Laying-Open No. 6-276609
PTL 2: Japanese Patent Laying-Open No. 2003-209969

SUMMARY OF INVENTION

Technical Field

Here, the required drive force of the vehicle varies to a large extent depending on the traveling condition. For example, while the vehicle is traveling at a low speed or traveling downhill, the required electric power is smaller than the total allowable charge and discharge power of a plurality of power storage devices. In such a case, it is desirable to stop a voltage converting operation of a voltage conversion unit (corresponding to the above-described DC-to-DC converter interface, boost/buck DC-to-DC converter) associated with a predetermined power storage device to reduce an electric power conversion loss of the voltage conversion unit.

The electric drive system disclosed in the above-referenced Japanese Patent Laying-Open No. 6-276609 (Patent Literature 1), however, is configured as follows. When a hard fault (short circuit or open circuit for example) of each battery is detected, the associated DC-to-DC converter is stopped from operating so that the drive system is operated with a two-third capacity. When a soft fault (degradation of the battery) occurs, an external control device is used to reduce a load on the degraded battery so that other two batteries keep the same voltage. How to control the DC-to-DC converter interface for reducing an electric power conversion loss is not particularly considered.

As for the electrical motor power management system disclosed in the above-referenced Japanese Patent Laying-Open No. 2003-209969 (Patent Literature 2) as well, it is merely disclosed that the electric current of the power supply stages is individually controlled so that the states of charge of the batteries are balanced, and no consideration is given to a control method of each power supply stage for reducing an electric power conversion loss.

The present invention has been made to solve the problems above, and an object of the invention is to provide a power supply system having a plurality of power storage devices for which control can be executed stably for reducing an electric power conversion loss, and a vehicle equipped with the power supply system.

Solution to Problem

A power supply system according to an aspect of the present invention is a power supply system having a plurality of power storage devices each configured to be chargeable and dischargeable. The power supply system includes: a pair of electric power lines electrically connected to a load device; a plurality of voltage conversion units provided respectively between the plurality of power storage devices and the pair of electric power lines, and each configured to perform a voltage converting operation between the pair of electric power lines and associated one of the power storage devices; a plurality of voltage detection units associated respectively with the plurality of power storage devices for detecting respective output voltages of the associated power storage devices, respectively; and a control device controlling the plurality of voltage conversion units in accordance with required electric power which is required by the load device. The plurality of power storage devices include first and second power storage devices that are configured so that one of the first and second power storage devices has a power supply voltage higher by a first predetermined value than the other power storage device. The first predetermined value is determined in accordance with errors which may be included in detected values of the plurality of voltage detection units.

Preferably, when the required electric power required by the load device is not more than a threshold value, the control device controls first and second voltage conversion units included in the plurality of voltage conversion units, based on output voltages of the plurality of power storage devices detected by the plurality of voltage detection units, so that a voltage converting operation is executed by one of the first and second voltage conversion units that is associated with one of the power storage devices that has a higher output voltage than the other, and a voltage converting operation by the other of the first and second voltage conversion units is stopped.

Preferably, the first predetermined value is determined so that the first predetermined value is larger than a sum of errors that may be included in detected values of the voltage detection units associated with the first and second power storage devices respectively.

Preferably, the plurality of voltage conversion units each include: a switching device connected in series with an inductor and disposed between one electric power line of the pair of electric power lines and one electrode of associated one of the power storage devices; and a line for electrically connecting the other electric power line of the pair of electric power lines and the other electrode of the associated power storage device. The control device keeps the switching device in an ON state in the voltage conversion unit which is executing the voltage converting operation.

A power supply system according to another aspect of the present invention is a power supply system having a plurality of power storage devices each configured to be chargeable and dischargeable. The power supply system includes: a pair of electric power lines electrically connected to a load device; a plurality of voltage conversion units provided respectively between the plurality of power storage devices and the pair of electric power lines, and each configured to perform a voltage converting operation between the pair of electric power lines and associated one of the power storage devices; a plurality of current detection units associated respectively with the plurality of power storage devices for detecting respective electric currents of the associated power storage devices, respectively; and a control device controlling the plurality of voltage conversion units in accordance with required electric power which is required by the load device. The plurality of power storage devices include first and second power storage devices that are configured so that one of the first and second power storage devices has a power supply voltage higher by a second predetermined value than the other power storage device. The second predetermined value is determined in accordance with errors which may be included in detected values of the plurality of current detection units.

Preferably, when the required electric power required by the load device is not more than a threshold value, the control device controls the plurality of voltage conversion units so that the pair of electric power lines and the associated power storage devices are electrically conductive for a predetermined period, and controls first and second voltage conversion units included in the plurality of voltage conversion units, based on an electric current which is detected in the predetermined period by a first current detection unit included in the plurality of current detection units and is of associated one of the power storage devices, so that a voltage converting operation is executed by one of the first and second voltage conversion units that is associated with one of the power storage devices having a higher output voltage than the other, and a voltage converting operation by the other of the first and second voltage conversion units is stopped.

Preferably, based on a polarity of the electric current of the associated power storage device that is detected by the first current detection unit in the predetermined period, the control device selects the voltage conversion unit associated with the power storage device that has a higher output voltage. The second predetermined value is determined so that the second predetermined value is larger than a value determined by converting an error which may be included in a detected value of the first current detection unit into a voltage difference between an output voltage of the first power storage device and an output voltage of the second power storage device.

Preferably, the plurality of voltage conversion units each include: a switching device connected in series with an inductor and disposed between one electric power line of the pair of electric power lines and one electrode of associated one of the power storage devices; and a line for electrically connecting the other electric power line of the pair of electric power lines and the other electrode of the associated power storage device. The control device keeps the switching device in an ON state in the voltage conversion unit which is executing the voltage converting operation.

A vehicle according to still another aspect of the present invention includes a power supply system as described above, and a drive force generation unit serving as the load device to generate a drive force for the vehicle from electric power received from the power supply system.

Advantageous Effects of Invention

In accordance with the present invention, for the power supply system having a plurality of power storage devices, control can be performed stably for reducing an electric power conversion loss of a voltage conversion unit.

BRIEF DESCRIPTION OF DRAWINGS

FIG. 12 is a flowchart showing a control structure of a converter ECU according to a third embodiment of the present invention.

DESCRIPTION OF EMBODIMENTS

Figure 1:
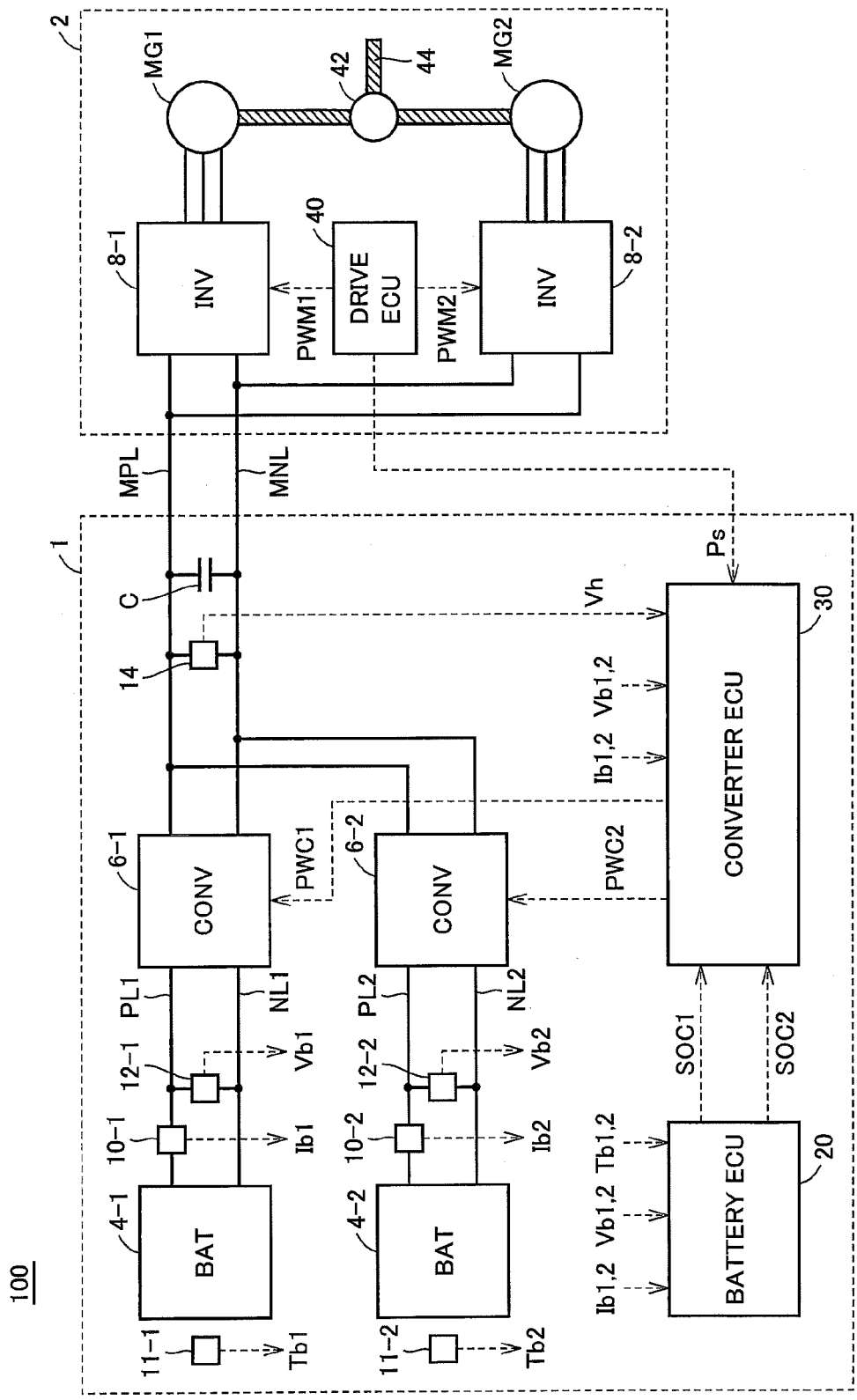
FIG. 1 is a schematic configuration diagram showing main components of a vehicle mounted with a power supply system according to a first embodiment of the present invention.

In the following, embodiments of the present invention will be described in detail with reference to the drawings. Note that the same reference characters in the drawings denote the same or corresponding parts.

First Embodiment

Schematic Configuration of Vehicle

FIG. 1 is a schematic configuration diagram showing main components of a vehicle 100 mounted with a power supply system 1 according to a first embodiment of the present invention.

Referring to FIG. 1, vehicle 100 includes a power supply system 1, a first inverter 8-1, a second inverter 8-2, a motor generator MG1, a motor generator MG2, and a drive ECU 40.

In connection with the first embodiment, a description will be given of power supply system 1 having two power storage devices 4-1, 4-2 as an example of the power supply system having a plurality of power storage devices.

Inverters 8-1, 8-2, motor generators MG1, MG2, and drive ECU 40 constitute a drive force generation unit 2 for generating a drive force for vehicle 100 to travel. This drive force generation unit 2 is herein illustrated as "load device". In other words, vehicle 100 is caused to travel by transmitting to wheels (not shown) a drive force generated from electric power supplied from power supply system 1 to drive force generation unit 2.

Configuration of Drive Force Generation Unit

Inverters 8-1 and 8-2 are connected in parallel to a main positive line MPL and a main negative line MNL that constitute a pair of electric power lines, and each supply and receive electric power to and from power supply system 1. Specifically, inverters 8-1 and 8-2 convert electric power (DC power) supplied via main positive line MPL and main negative line MNL into AC power and supply the AC power to motor generators MG1 and MG2 respectively, and convert AC power generated by motor generators MG1 and MG2 respectively into DC power and return the DC power as regenerative power back to power supply system 1. By way of example, inverters 8-1, 8-2 are each formed of a bridge circuit including arm circuits for three phases respectively, and respective power converting operations are controlled by switching commands PWM1, PWM2 from drive ECU 40.

Motor generator MG1 receives motive power generated by operation of an engine (not shown) to function as an electric generator (generator) capable of generating electric power, and generates electric power from a rotational drive force transmitted via a power split device 42.

Motor generator MG2 functions as an electric motor (motor) generating a drive force from at least one of electric power generated by motor generator MG1 and electric power from power storage devices 4-1, 4-2. The rotational drive force generated by motor generator MG2 is synthesized with the rotational drive force of the engine at power split device 42 to be supplied to wheels (not shown). While the vehicle is braked by a driver's manipulation of a brake for example, motor generator MG2 may also function as an electric generator (generator) to regeneratively supply the kinetic energy of vehicle 100 in the form of electrical energy to power storage devices 4-1, 4-2.

By way of example, motor generators MG1, MG2 are each formed of a permanent-magnet three-phase AC rotating machine including a rotor in which a permanent magnet is embedded. Motor generators MG1, MG2 each also have a stator including Y (star)-connected three-phase stator coils.

Drive ECU 40 performs an operational process so that drive forces are generated respectively by the engine and motor generators MG1, MG2 at an optimum ratio. Drive ECU 40 executes a program stored in advance to calculate, based on signals transmitted from respective sensors (not shown), the traveling condition, the rate of change of the accelerator pedal position, and a stored map and the like, the drive electric power (hereinafter also referred to as required electric power) Ps which is required of power supply system 1 by drive force generation unit 3, and calculate a target torque value and a target rotational speed value of motor generators MG1, MG2 based on calculated required electric power Ps. Then, drive ECU 40 generates switching commands PWM1, PWM2 to control inverters 8-1, 8-2, so that the generated torque and the rotational speed of motor generators MG1, MG2 are equal to the target torque value and the target rotational speed value. Drive ECU 40 also outputs calculated required electric power Ps to power supply system 1.

Configuration of Power Supply System

Power supply system 1 includes a smoothing capacitor C, an input/output voltage detection unit 14, a first converter 6-1, a second converter 6-2, output current detection units 10-1, 10-2, output voltage detection units 12-1, 12-2, temperature detection units 11-1, 11-2, a converter ECU 30, and a battery ECU 20.

Smoothing capacitor C is connected between main positive line MPL and main negative line MNL, and reduces a fluctuation component included in drive electric power which is output from converters 6-1, 6-2, and regenerative electric power supplied from drive force generation unit 2. Input/output voltage detection unit 14 is connected between main positive line MPL and main negative line MNL to detect an input/output voltage Vh of the drive electric power and the regenerative electric power supplied and received to and from drive force generation unit 2 and output the detected value to converter ECU 30.

First converter 6-1 and second converter 6-2 are connected in parallel to main positive line MPL and main negative line MNL. First converter 6-1 is provided between main positive line MPL and main negative line MNL and first power storage device 4-1 and, based on a switching command PWC1 from converter ECU 30, performs an electric power converting operation between first power storage device 4-1 and main positive line MPL and main negative line MNL. Specifically, first converter 6-1 steps up the electric power discharged from first power storage device 4-1 to a predetermined voltage to supply the resultant power as drive electric power, and steps down the regenerative electric power supplied from drive force generation unit 2 to a predetermined voltage to output the resultant power to first power storage device 4-1.

Second converter 6-2 is provided between main positive line MPL and main negative line MNL and second power storage device 4-2 and, based on a switching command PWC2 from converter ECU 30, performs an electric power converting operation between second power storage device 4-2 and main positive line MPL and main negative line MNL. Specifically, second converter 6-2 steps up the electric power discharged from second power storage device 4-2 to a predetermined voltage to supply the resultant power as drive electric power, and steps down the regenerative electric power supplied from drive force generation unit 2 to a predetermined voltage to output the resultant power to second power storage device 4-2.

First power storage device 4-1 and second power storage device 4-2 are each a chargeable and dischargeable DC power supply, and formed for example of a secondary battery such as nickel-metal hydride battery or lithium ion battery, or electrical double layer capacitor. The power supply voltages of power storage devices 4-1, 4-2 are set so that the power supply voltage of one power storage device is higher by a predetermined value than the power supply voltage of the other power storage device, as described later herein. The voltages are thus set for example by adjusting the number of battery cells provided in each power storage device.

Power storage devices 4-1, 4-2 may be configured to be chargeable by receiving motive power which is generated by operation of the engine while the system of vehicle 100 is in an active state, and also chargeable by being electrically connected to an external power supply via a charge cable (not shown) while the system of vehicle 100 is stopped.

Output voltage detection unit 12-1 is connected between a positive line PL1 and a negative line NL1 which connect first power storage device 4-1 and first converter 6-1, detects an output voltage Vb1 relevant to input/output of first power storage device 4-1, and outputs the result of detection to battery ECU 20 and converter ECU 30. Output voltage detection unit 12-2 is connected between a positive line PL2 and a negative line NL2 which connect first power storage device 4-2 and second converter 6-2, detects an output voltage Vb2 relevant to input/output of second power storage device 4-2, and outputs the result of detection to battery ECU 20 and converter ECU 30.

Output current detection units 10-1, 10-2 are provided on positive lines PL1, PL2 connecting power storage devices 4-1, 4-2 and converters 6-1, 6-2 respectively, detect output currents Ib1, Ib2 relevant to input/output of associated power storage devices 4-1, 4-2, and output the result of detection to battery ECU 20 and converter ECU 30.

Temperature detection units 11-1, 11-2 are arranged near battery cells for example that constitute power storage devices 4-1, 4-2, detect temperatures Tb1, Tb2 of power storage devices 4-1, 4-2, and output the result of detection to battery ECU 20. Temperature detection units 11-1, 11-2 may be configured to output a representative value determined by averaging or the like, based on the result of detection of a plurality of detection devices arranged in association with a plurality of battery cells constituting power storage devices 4-1, 4-2, respectively.

Battery ECU 20 is a device for monitoring and controlling power storage devices 4-1, 4-2, and operates in cooperation with converter ECU 30 connected thereto via a control line to keep the value representing the charging state (SOC: State of Charge) of power storage devices 4-1, 4-2 in a predetermined range. Specifically, battery ECU 20 calculates respective SOCs of power storage devices 4-1, 4-2 based on output currents Ib1, Ib2 from output current detection units 10-1, 10-2, output voltages Vb1, Vb2 from output voltage detection units 12-1, 12-2, and temperatures Tb1, Tb2 from temperature detection units 11-1, 11-2. For the configuration for calculating the SOC of each power storage device, any of various well-known techniques may be used. Battery ECU 20 outputs to converter ECU 30 the calculated SOCs each and allowable electric power determined depending on the SOC (allowable charge electric power and allowable discharge electric power).

Converter ECU 30 cooperates with battery ECU 20 and drive ECU 40 connected thereto via a control line to control the voltage converting operation of converters 6-1 and 6-2 so that the value of electric power (required electric power) Ps which is required by drive force generation unit 2 may be shared at a predetermined ratio between power storage devices 4-1 and 4-2. Specifically, converter ECU 30 generates switching commands PWC1, PWC2 for converters 6-1, 6-2 respectively, in accordance with a control mode which is selected in advance from control modes described later herein.

Configuration of Converters

Figure 2:
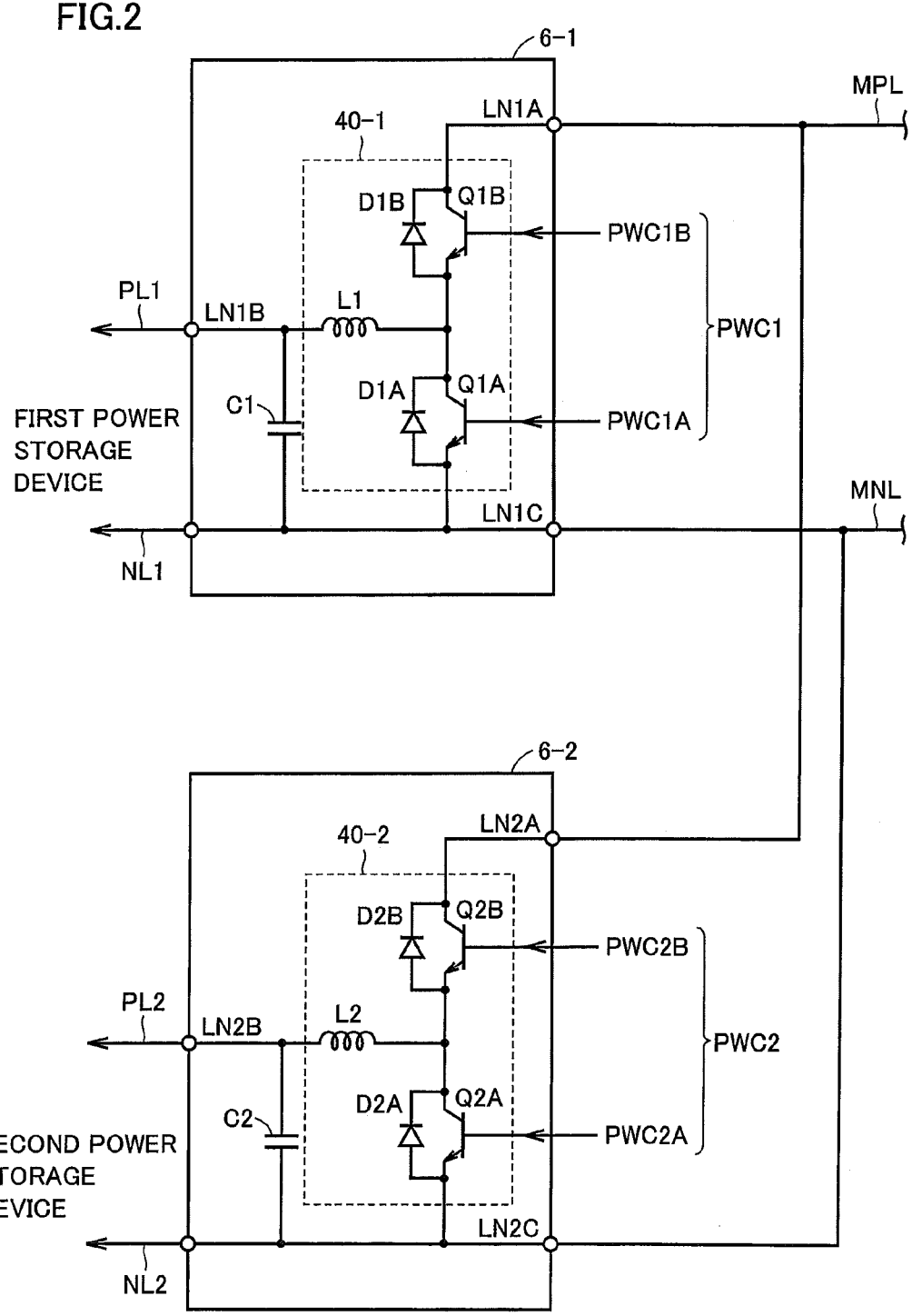
FIG. 2 is a schematic configuration diagram of a converter according to the first embodiment of the present invention.

FIG. 2 is a schematic configuration diagram of converters 6-1, 6-2 according to the first embodiment of the present invention.

Referring to FIG. 2, first converter 6-1 is configured to include a chopper circuit 40-1 and a smoothing capacitor C1.

Chopper circuit 40-1 follows switching command PWC1 from converter ECU 30 (FIG. 1) to step up the DC power (drive electric power) received from first power storage device 4-1 for discharging, and steps down the DC power (regenerative electric power) received from main positive line MPL and main negative line MNL for charging. Chopper circuit 40-1 includes a positive line LN1A, a negative line LN1C, a line LN1B, transistors Q1A, Q1B that are switching devices, diodes D1A, D1B, and an inductor L1.

Positive line LN1A has one end connected to the collector of transistor Q1B, and the other end connected to main positive line MPL. Negative line LN1C has one end connected to negative line NL1 and the other end connected to main negative line MNL.

Transistors Q1A and Q1B are connected in series between negative line LN and positive line LN1A. The emitter of transistor Q1A is connected to negative line LN1C, and the collector of transistor Q1B is connected to positive line LN1A.

Between the collector and the emitter of transistors Q1A and Q1B, diodes D1A and D1B allowing electric current to flow from the emitter to the collector are connected, respectively. Further, inductor L1 is connected to a point of connection between transistor Q1A and transistor Q1B.

Line LN1B has one end connected to positive line PL1 and the other end connected to inductor L1.

Smoothing capacitor C1 is connected between line LN1B and negative line LN1C and reduces an AC component included in the DC voltage between line LN1B and negative line LN1C.

In the following, a voltage converting operation (voltage step up operation and voltage step down operation) of first converter 6-1 will be described. When the voltage step-up operation is performed, converter ECU 30 (FIG. 1) keeps transistor Q1B in the OFF state and causes transistor Q1A to be turned on and off at a predetermined duty ratio. In an ON period of transistor Q1A, discharge current flows from first power storage device 4-1 via line LN1B, inductor L1, diode D1B, and positive line LN1A in this order to main positive line MPL. At the same time, pump current flows from first power storage device 4-1 via line LN1B, inductor L1, transistor Q1A, and negative line LN1C in this order. Inductor L1 accumulates electromagnetic energy by this pump current. Subsequently, transistor Q1A changes from the ON state to the OFF state. Then, inductor L1 superimposes the accumulated electromagnetic energy on discharge current. As a result, the average voltage of DC electric power supplied from first converter 6-1 to main positive line MPL and main negative line MNL is stepped up by a voltage corresponding to the electromagnetic energy accumulated in inductor L1 in accordance with the duty ratio.

In contrast, when the voltage step-down operation is performed, converter ECU 30 causes transistor Q1B to turn on and off at a predetermined duty ratio and keeps transistor Q1A in the OFF state. In an ON period of transistor Q1B, charge current flows from main positive line MPL via positive line LN1A, transistor Q1B, inductor L1, and line LN1B in this order to first power storage device 4-1. Subsequently, transistor Q1B changes from the ON state to the OFF state. Then, inductor L1 generates a magnetic flux to hinder a change in electric current. The charge current thus continues flowing via diode D1A, inductor L1, and line LN1B in this order. In terms of electrical energy, it is only in the ON period of transistor Q1B that DC power is supplied via main positive line MPL and main negative line MNL. Where the charge current is kept constant (where the inductance of inductor L1 is sufficiently large), the average voltage of the DC power supplied from first converter 6-1 to first power storage device 4-1 is a value determined by multiplying the DC voltage between main positive line MPL and main negative line MNL by the duty ratio.

In order to control such a voltage converting operation of first converter 6-1, converter ECU 30 generates switching command PWC1 including switching command PWC1A for controlling ON and OFF of transistor Q1A and switching command PWC1B for controlling ON and OFF of transistor Q1B.

Second converter 6-2 is configured and operates similarly to first converter 6-1 as described above, and the detailed description will not be repeated.

Control Structure

The control structure of converter ECU 30 will hereinafter be described in more detail. Converter ECU 30 controls the voltage converting operation of converters 6-1, 6-2 following the principle illustrated in FIG. 3.

Figure 3:
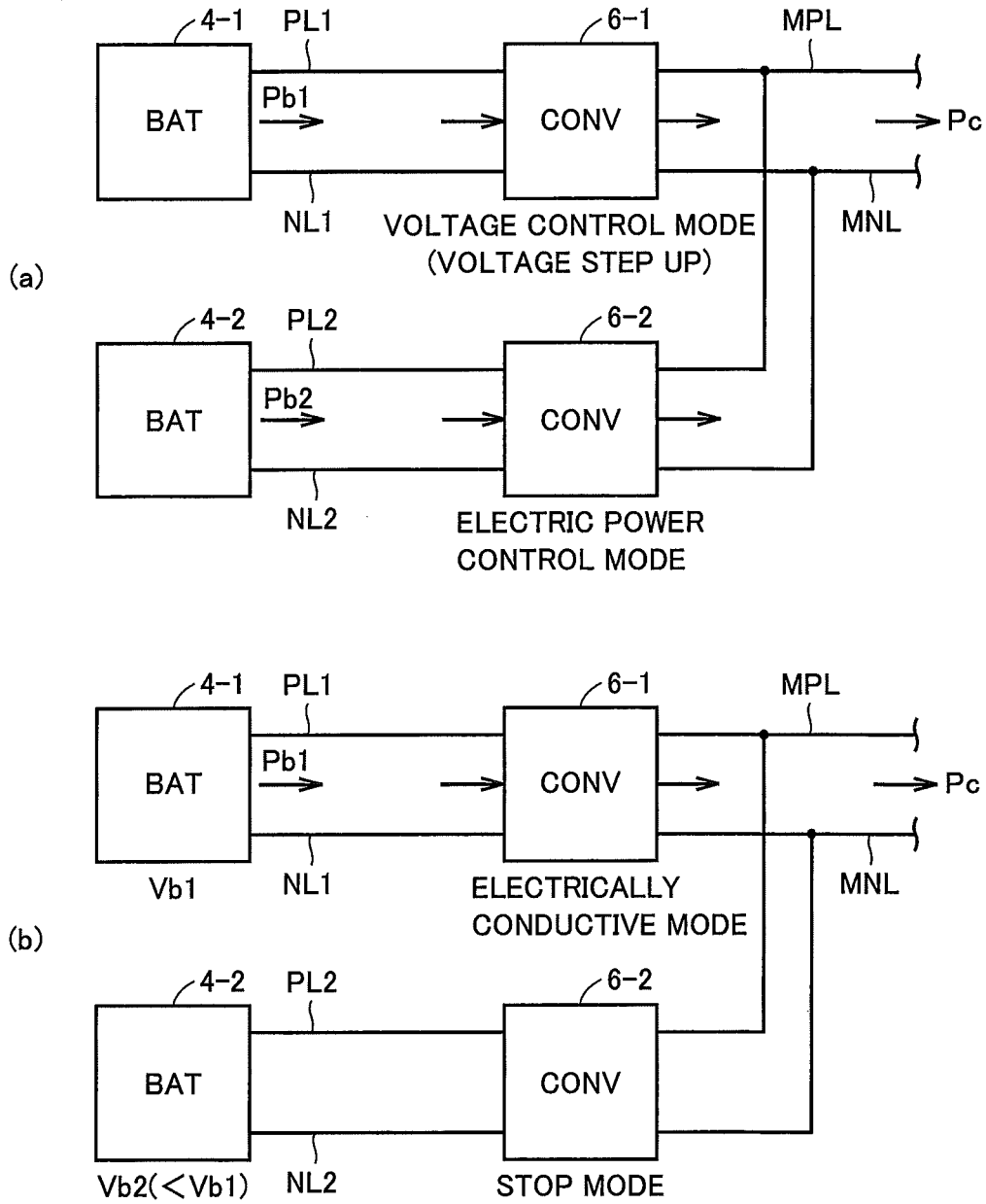
FIGS. 3(a) and 3(b) are diagrams generally showing electric power supply to a drive force generation unit according to the first embodiment of the present invention.

FIG. 3 is a diagram generally showing supply of electric power to drive force generation unit 2, according to the first embodiment of the present invention. FIG. 3(a) shows the case where an electric power value (required electric power) Ps required by drive force generation unit 2 is relatively high, and FIG. 3(b) shows the case where required electric power Ps is relatively low.

Referring to FIG. 3(a), where required electric power Ps is high, discharged electric power Pb1 from first power storage device 4-1 and discharged electric power Pb2 from second power storage device 4-2 are supplied to drive force generation unit 2. Therefore, between supplied electric power Pc supplied to drive force generation unit 2 and discharged electric power Pb discharged from power storage devices 4-1 and 4-2, the following relation holds:

discharged electric power Pb1+discharged electric power Pb2=supplied electric power Pc.

Here, by way of example, in power supply system 1 according to the first embodiment, first converter 6-1 operates as "master" and second converter 6-2 operates as "slave". First converter 6-1 operating as "master" is controlled in accordance with "voltage control mode (voltage step up)" for setting the voltage value of the electric power supplied from power supply system 1 to drive force generation unit 2 (input/output voltage value Vh between main positive line MPL and main negative line MNL) to a predetermined target voltage value. In contrast, second converter 6-2 operating as "slave" is controlled in accordance with "electric power control mode" for setting electric power to be shared by relevant second power storage device 4-2, of the electric power to be supplied from power supply system 1 to drive force generation unit 2 (electric power supplied and received between second power storage device 4-2 and main positive line MPL and main negative line MNL) to a predetermined target electric power value. In this way, discharged electric power Pb2 from second power storage device 4-2 can be adjusted in an arbitrary manner, and therefore, discharged electric power Pb1 from first power storage device 4-1 can indirectly be controlled.

Here, if required electric power Ps decreases to a threshold value Pth or less, the control mode of converters 6-1 and 6-2 is switched as shown in FIG. 3(b) so that one of converters 6-1 and 6-2 executes the voltage converting operation and the voltage converting operation of the other is stopped. Threshold value Pth is set in accordance with allowable charge/discharge electric power of first power storage device 4-1 and second power storage device 4-2. Specifically, if required electric power Ps required by drive force generation unit 2 is smaller than the allowable charge/discharge electric power of power storage device 4-1 or 4-2, converter ECU 30 stops the voltage converting operation of one of the converters to reduce the electric power conversion loss.

More specifically, based on output voltages Vb1, Vb2 provided from output voltage detection units 12-1, 12-2 (FIG. 1), converter ECU 30 selects the converter associated with one of power storage devices 4-1, 4-2 that has a higher output voltage, and causes the converter to perform the voltage converting operation. This is for the purpose of suppressing generation of short-circuit current between the power storage devices and avoiding abnormal degradation and unwanted loss of the power storage devices. In other words, if the output voltage of the power storage device connected to the converter which is being stopped from performing the voltage converting operation is larger than the output voltage of the other power storage device, short-circuit current is generated to reverse through the converter which is being stopped from performing the voltage converting operation.

In connection with the first embodiment, the case where output voltage Vb1 of first power storage device 4-1 is higher than output voltage Vb2 of second power storage device 4-2 will be described by way of example. In this case, first converter 6-1 is switched to an electrically conductive mode and second converter 6-2 is switched to a stop mode. Namely, first converter 6-1 keeps an electrically conductive state between first power storage device 4-1 and main positive line MPL and main negative line MNL. Second converter 6-2 stops performing the voltage converting operation. Therefore, between supplied electric power Pc supplied to drive force generation unit 2 and discharged electric power Pb1 discharged from first power storage device 4-1, the following relation holds:

discharged electric power Pb1=supplied electric power Pc.

At this time, in first converter 6-1, transistor Q1B (FIG. 2) connected to main positive line MPL is kept in the ON state. Namely, switching command PWC1B with a duty ratio of 100% is provided from converter ECU 30 to transistor Q1B. In contrast, transistor Q1A connected to main negative line MNL is kept in the OFF state. Namely, switching command PWC1A with a duty ratio of 0% is provided from converter ECU 30 to transistor Q1A. Accordingly, positive line PL1 is electrically connected to main positive line MPL via inductor L1 and transistor Q1B, and negative line NL1 is directly connected to main negative line MNL.

In contrast, in second converter 6-2, transistor Q2B (FIG. 2) connected to main positive line MPL and transistor Q2A connected to main negative line MNL are both kept in the OFF state. Namely, switching commands PWC2B, PWC2A with a duty ratio of 0% are provided from converter ECU 30 to transistors Q2B, Q2A, respectively.

Process Flow

A description will be given below of a control structure for implementing the switching of the control mode as described above.

Figure 4:
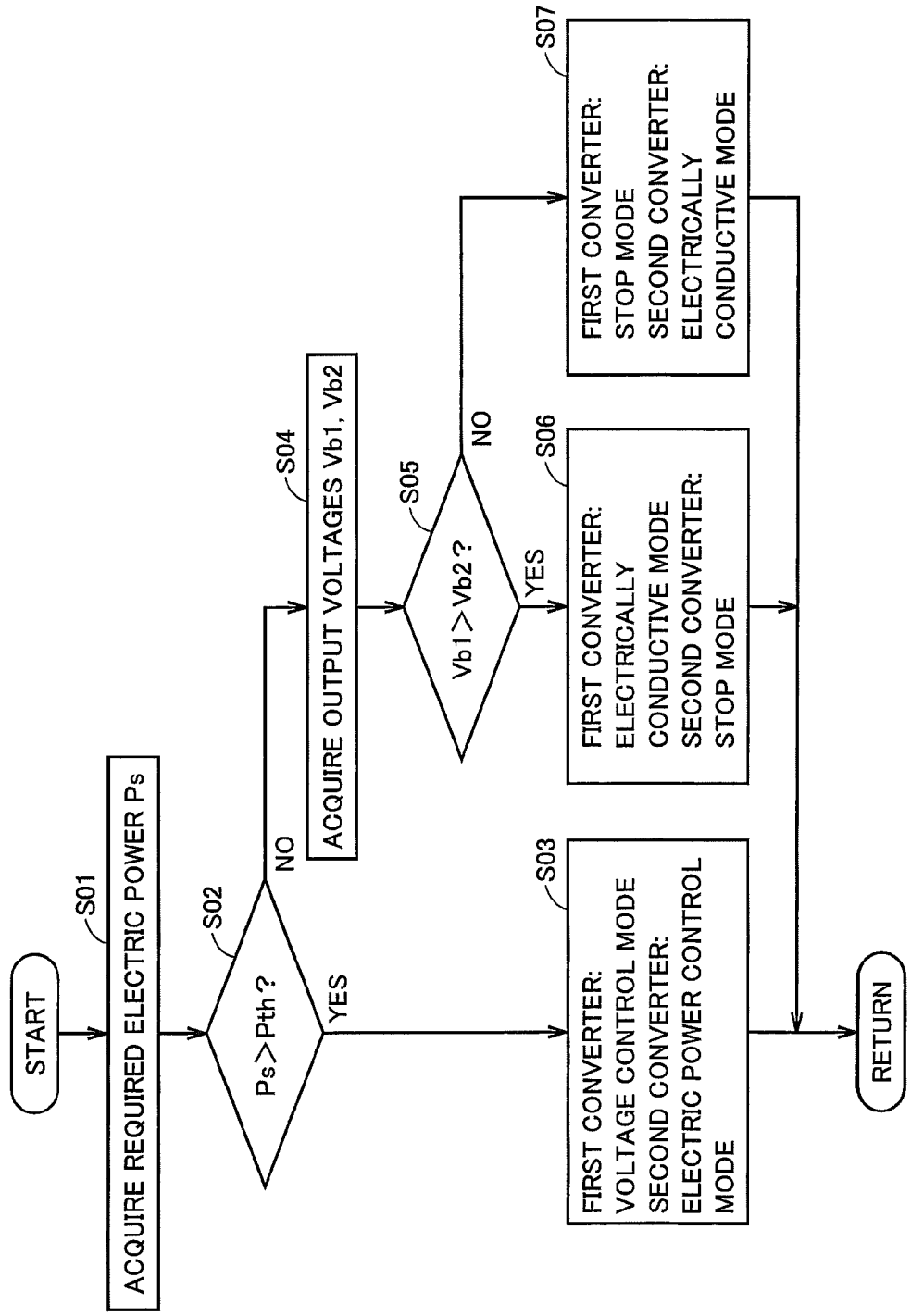
FIG. 4 is a flowchart showing a control structure of a converter ECU according to the first embodiment of the present invention.

FIG. 4 is a flowchart showing a control structure of converter ECU 30 according to the first embodiment of the present invention. The flowchart shown in FIG. 4 may be implemented by executing a program stored in advance by converter ECU 30.

Referring to FIG. 4, converter ECU 30 acquires required electric power Ps from drive ECU 40 (step S01), and determines whether or not required electric power Ps is higher than threshold value Pth (step S02). Namely, it is determined whether or not the required electric power is a high load.

When required electric power Ps is higher than threshold value Pth (YES in step S02), namely when required electric power Ps is a high load, converter ECU 30 sets first converter 6-1 in the voltage control mode (voltage step up) so that first converter 6-1 operates as "master", and sets second converter 6-2 in the electric power control mode so that second converter 6-2 operates as "slave" (step S03).

In contrast, when required electric power Ps is threshold value Pth or less (NO in step S02), namely required electric power Ps is a low load, output voltages Vb1, Vb2 of power storage devices 4-1, 4-2 are acquired respectively from output voltage detection units 12-1, 12-2 (FIG. 1) (step S04). Then, converter ECU 30 determines whether or not output voltage Vb1 of first power storage device 4-1 is higher than output voltage Vb2 of second power storage device 4-2 (step S05).

When output voltage Vb1 of first power storage device 4-1 is higher than output voltage Vb2 of second power storage device 4-2 (YES in step S05), converter ECU 30 switches first converter 6-1 to the electrically conductive mode and switches second converter 6-2 to the stop mode (step S06).

In contrast, when output voltage Vb1 of first power storage device 4-1 is equal to or less than output voltage Vb2 of second power storage device 4-2 (NO in step S05), converter ECU 30 switches first converter 6-1 to the stop mode and switches second converter 6-2 to the electrically conductive mode (step S07).

As seen from the foregoing, in accordance with the first embodiment, when required electric power Ps becomes a low load, the converter associated with the power storage device of a higher output voltage is switched to the electrically conductive mode, and the converter associated with the other power storage device is switched to the stop mode. Thus, while electric power supply to drive force generation unit 2 is continued, one of converters 6-1 and 6-2 stops performing the voltage converting operation. Therefore, a switching loss (electric power conversion loss) relevant to electric power supply from the associated power storage device to main positive line MPL and main negative line MNL can be reduced. Therefore, even if the electric power supply from one power storage device is accompanied by a relatively larger value of the electric current flowing in the associated converter, generation of an unwanted loss can be suppressed. Accordingly, the energy efficiency of power supply system 1 can be improved, and thus the total fuel consumption efficiency of vehicle 100 equipped with power supply system 1 can further be improved.

Configuration of Multiple Power Storage Devices

Here, the operation shown in step S05 of the process flow in FIG. 4 is carried out by a comparison between respective detected values (output voltages Vb1, Vb2) of output voltage detection units 12-1, 12-2 associated respectively with power storage devices 4-1, 4-2.

If at least one of the detected values of output voltage detection units 12-1, 12-2 includes an error, however, the result of comparison between output voltages Vb1, Vb2 may be wrong. If the control mode of converters 6-1, 6-2 is switched based on the wrong result of comparison, short-circuit current Is as shown in FIG. 5 may be generated between first power storage device 4-1 and second power storage device 4-2.

Figure 5:
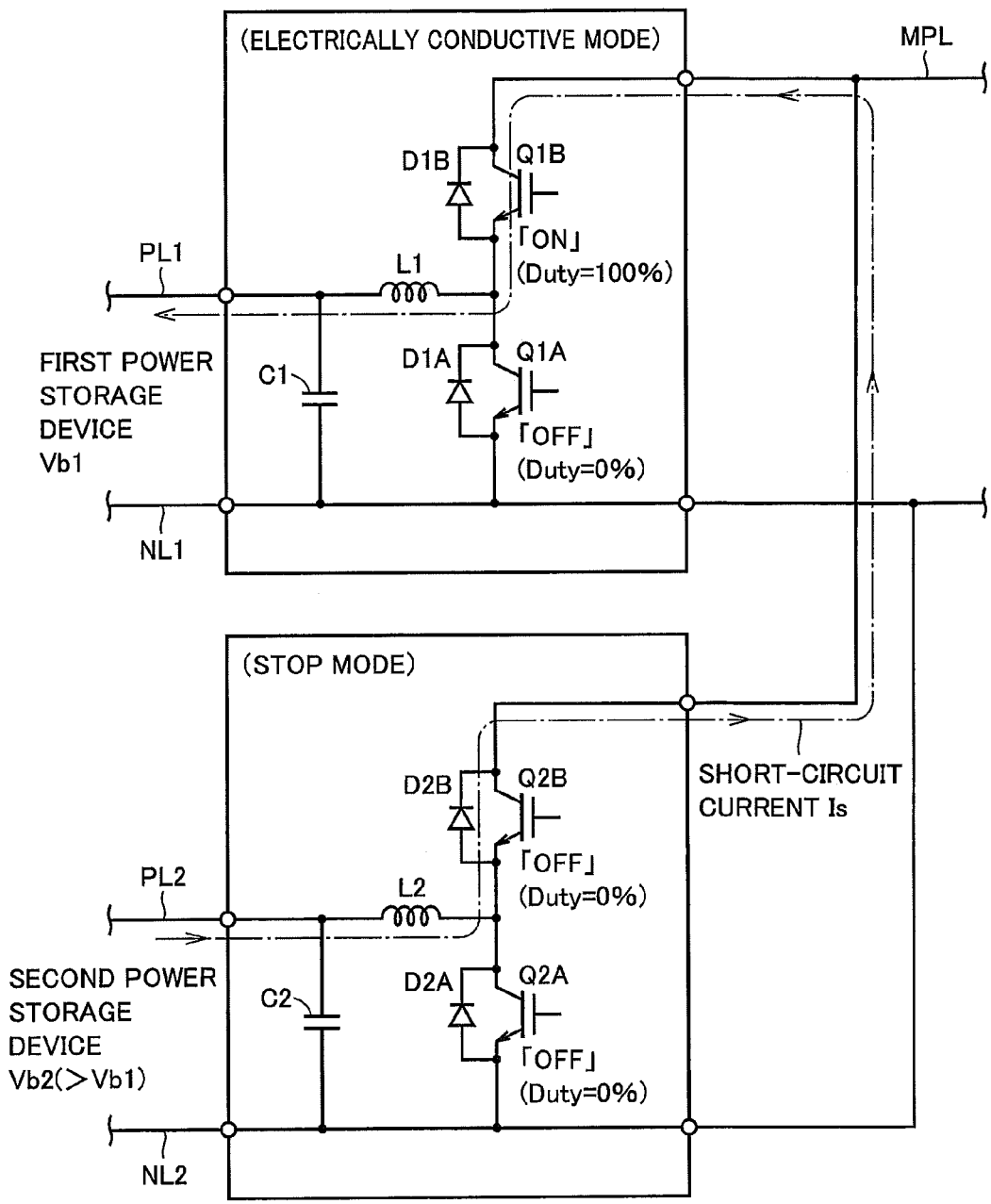
FIG. 5 is an operating state diagram of a first converter and a second converter in a control mode shown in FIG. 3(b).

FIG. 5 is an operating state diagram of first converter 6-1 and second converter 6-2 in the control mode shown in FIG. 3(b).

As described in connection with FIG. 3(b), when required electric power Ps is a low load, converter ECU 30 switches the control mode of first converter 6-1 to the electrically conductive mode, and switches the control mode of second converter 6-2 to the stop mode, based on the result of comparison that output voltage Vb1 of first power storage device 4-1 detected by output voltage detection unit 12-1 (FIG. 1) is higher than output voltage Vb2 of second power storage device 4-2 detected by output voltage detection unit 12-2 (FIG. 1).

In this way, in first converter 6-1, transistor Q1B is kept in the ON state while transistor Q1A is kept in the OFF state. Accordingly, positive line PL1 is electrically connected to main positive line MPL via inductor L1 and transistor Q1B. In second converter 6-2, transistors Q2B and Q2A are both kept in the OFF state.

Here, if at least one of output voltage detection units 12-1 and 12-2 has an error included in the detected value of the output voltage of the associated power storage device, relative to the true output voltage thereof, it could occur that the true output voltage of second power storage device 4-2 is higher than the true output voltage of first power storage device 4-1, contrary to the above-described result of comparison by converter ECU 30.

This could occur, for example, when respective detected values of output voltage detection units 12-1, 12-2 each include a positive maximum error and a negative maximum error, and the positive maximum error is superimposed on the detected value of output voltage detection unit 12-1 while the negative maximum error is superimposed on the detected value of output voltage detection unit.

Then, if first converter 6-1 associated with first power storage device 4-1 with a relatively lower output voltage is controlled in accordance with the electrically conductive mode while second converter 6-2 associated with second power storage device 4-2 with a relatively higher output voltage is controlled in accordance with the stop mode, an electric current path is generated through which electric current flows from second power storage device 4-2 via diode D2B of second converter 6-2, main positive line MPL, and transistor Q1B of first converter 6-1 to first power storage device 4-1. Flow of short-circuit current Is through this electric current path causes first power storage device 4-1 to deteriorate and causes an unwanted loss. Therefore, in order to suppress generation of short-circuit current Is between the power storage devices, it is necessary to accurately perform a comparison between respective output voltages of the power storage devices without being influenced by errors that may be included in the detected value of each output voltage detection unit.

Figure 6:
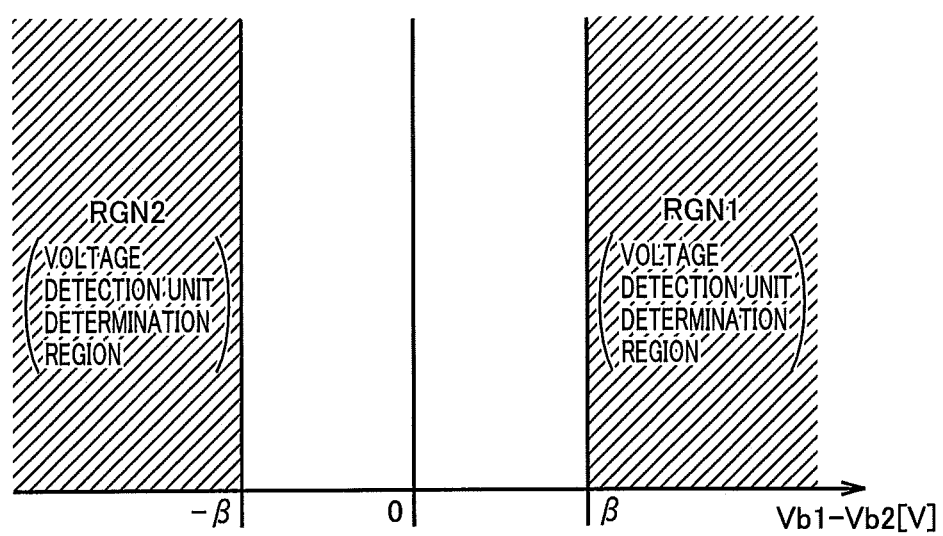
FIG. 6 is a diagram showing a range of a voltage difference between power storage devices that can be determined based on detected values of output voltage detection units.

FIG. 6 shows a range of the voltage difference (=Vb1−Vb2) between the power storage devices that can be determined based on the detected values of output voltage detection units 12-1, 12-2. Referring to FIG. 6, the voltage difference between the power storage devices is calculated by subtracting detected value Vb2 of output voltage detection unit 12-2 from detected value Vb1 of output voltage detection unit 12-1. Namely, the calculated voltage difference. (=Vb1−Vb2) has one of a positive value, zero, and a negative value depending on the magnitude relationship between respective detected values of the output voltage detection units.

When, however, output voltage detection unit 12-1 includes positive and negative maximum errors ΔV1, and output voltage detection unit 12-2 includes positive and negative maximum errors ΔV2, it could occur that the positive maximum error (+ΔV1) is superimposed on detected value Vb1 of output voltage detection unit 12-1 and the negative maximum error (−ΔV2) is superimposed on detected value Vb2 of output voltage detection unit 12-2. In such a case, the voltage difference calculated from detected values Vb1, Vb2 includes an error corresponding to the sum of respective maximum errors of the output voltage detection units (=ΔV1+ΔV2). Therefore, if the voltage difference between the power storage devices is smaller than this sum, the sign (positive or negative) of the voltage difference between detected values Vb1, Vb2 is opposite to that of the true voltage difference. In other words, the magnitude relationship between detected values Vb1, Vb2 is opposite to the magnitude relationship between the true output voltages, which therefore results in an error in the result of comparison between respective output voltages of the power storage devices.

FIG. 6 shows the sum 13 of respective positive maximum errors of the output voltage detection units (=ΔV1+ΔV2), and the sum −β of respective negative maximum errors of the output voltage detection units (=−ΔV1−ΔV2). The above-described error in the result of comparison occurs when the true voltage difference between the power storage devices falls in the voltage range defined by these two sums β and −β. In other words, when the true voltage difference between the power storage devices is larger than sump (corresponding to a region RGN1 in FIG. 6), or the true voltage difference therebetween is smaller than sum −β (corresponding to a region RGN2 in FIG. 6), the result of comparison between respective voltage values of the power storage devices is accurate without being influenced by the maximum errors of the output voltage detection units.

In view of this, power supply system 1 according to the first embodiment is configured to set a voltage difference in advance so that the power supply voltage of one of the power storage devices is higher by a predetermined value than the power supply voltage of the other power storage device. This configuration can be implemented for example by adjusting the number of battery cells provided in the power storage devices.

Here, the predetermined value of this configuration is determined in accordance with errors which may be included in respective detected values of the output voltage detection units. Specifically, the predetermined value is determined so that a difference in power supply voltage between the power storage devices falls in one of regions RGN1, RGN2 that can be determined by the detected values of the output voltage detection units as shown in FIG. 6. Namely, the predetermined value is a value larger than the sum β of the maximum error of output voltage detection unit 12-1 and the maximum error of output voltage detection unit 12-1.

With this configuration, regardless of errors that may be included in respective detected values of the output voltage detection units, the magnitude relationship between detected values Vb1, Vb2 of output voltage detection units 12-1, 12-2 is always the same as the magnitude relationship between the true output voltages. In this way, occurrence of an error to the result of comparison between respective output voltages of the power storage devices is suppressed, and therefore, occurrence of short-circuit electric current between the power storage devices can be suppressed. Accordingly, control can be performed stably for reducing an electric power conversion loss of the voltage conversion unit.

Second Embodiment

As described above, when required electric power Ps is a low load, converter ECU 30 switches the control mode of the converter associated with one of power storage devices 4-1, 4-2 that has a higher output voltage, to the electrically conductive mode, and switches the control mode of the converter associated with the other power storage device, to the stop mode.

Here, as to how the converter associated with the power storage device of a higher output voltage is selected, the first embodiment compares, by converter ECU 30, output voltages Vb1, Vb2 detected respectively by output voltage detection units 12-1, 12-2 (FIG. 1). Alternatively, as described below in connection with a second embodiment, the selection may be made based on output current Ib1 or Ib2 detected by output current detection unit 10-1 or 10-2 (FIG. 1).

In the following, a description will be given of a control structure of converter ECU 30 according to the second embodiment. A power supply system according to the second embodiment has the same configuration as power supply system 1 shown in FIG. 1, and therefore the illustration and the detailed description will not be repeated here.

Figure 7:
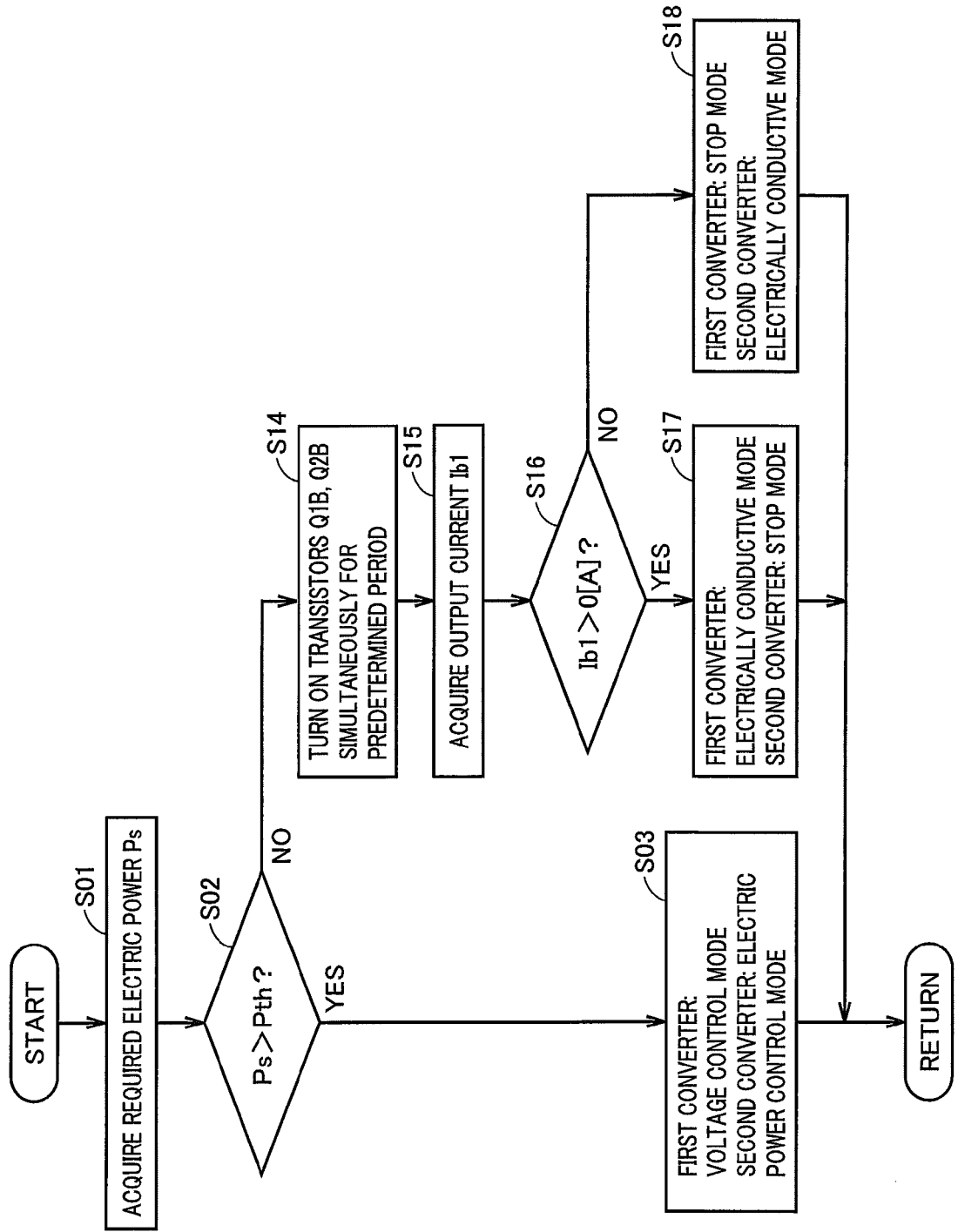
FIG. 7 is a flowchart showing a control structure of a converter ECU according to a second embodiment of the present invention.

FIG. 7 is a flowchart showing a control structure of converter ECU 30 according to the second embodiment of the present invention. The flowchart shown in FIG. 7 can be implemented by executing a program stored in advance by converter ECU 30.

Referring to FIG. 7, converter ECU 30 acquires required electric power Ps from drive ECU 40 (step S01), and determines whether or not required electric power Ps is larger than threshold value Pth (step S02). Namely, whether or not the required electric power is a high load is determined.

When required electric power Ps is larger than threshold value Pth (YES in step S02), namely required electric power Ps is a high load, converter ECU 30 sets first converter 6-1 in the voltage control mode (voltage step up) in order to cause first converter 6-1 to operate as "master", and sets second converter 6-2 in the electric power control mode in order to cause second converter 6-2 to operate as "slave" (step S03).

In contrast, when required electric power Ps is not more than threshold value Pth (NO in step S02), namely required electric power Ps is a low load, converter ECU 30 controls transistor Q1B of first converter 6-1 and transistor Q2B of second converter 6-2 so that these transistors are simultaneously in the ON state for a predetermined period (step S14).

Figure 8:
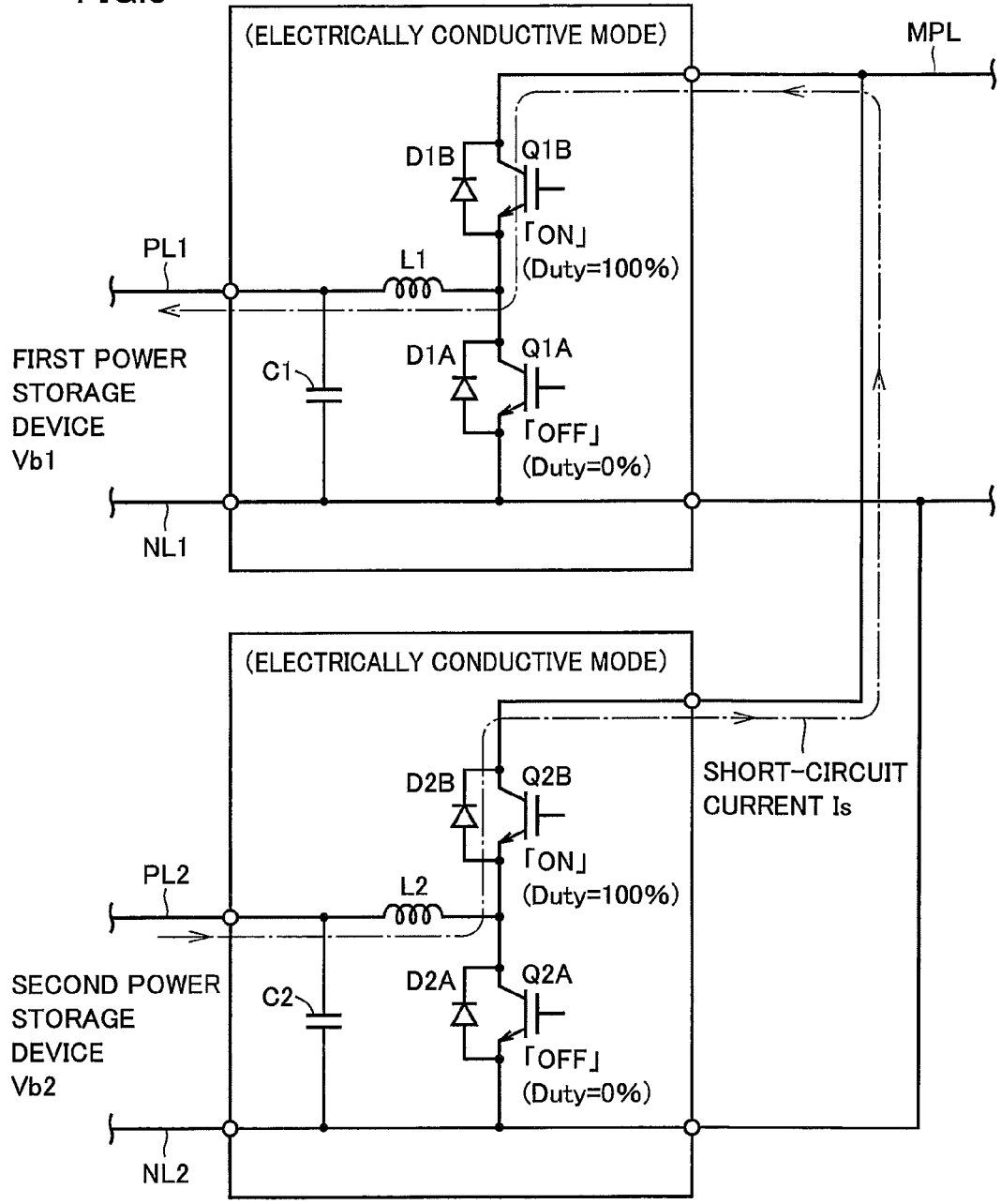
FIG. 8 is an operating state diagram of a first converter and a second converter in a predetermined period in step S14 of FIG. 7.

FIG. 8 shows an operating state diagram of first converter 6-1 and second converter 6-2 in the predetermined period. Referring to FIG. 8, transistors Q1B, Q2B connected to main positive line MPL are both kept in the ON state. Namely, to transistors Q1B, Q2B, a switching command with a duty ratio of 100% is provided from converter ECU 30. In contrast, transistors Q1A, Q2A connected to main negative line MNL are both kept in the OFF state. Namely, to transistors Q1A, Q2A, a switching command with a duty ratio of 0% is provided from converter ECU 30.

In this way, first converter 6-1 and second converter 6-2 are both switched to the electrically conductive mode. Consequently, positive line PL1 is electrically connected via inductor L1 and transistor Q1B to main positive line MPL, and negative line NL1 is directly connected to main negative line MNL. Positive line PL2 is electrically connected via inductor L2 and transistor Q2B to main positive line MPL, and negative line NL1 is directly connected to main negative line MNL. Therefore, an electric current path is generated between first power storage device 4-1 and second power storage device 4-2. Through the electric current path, short-circuit current Is in accordance with a voltage difference between the power storage devices flows.

Figure 9:
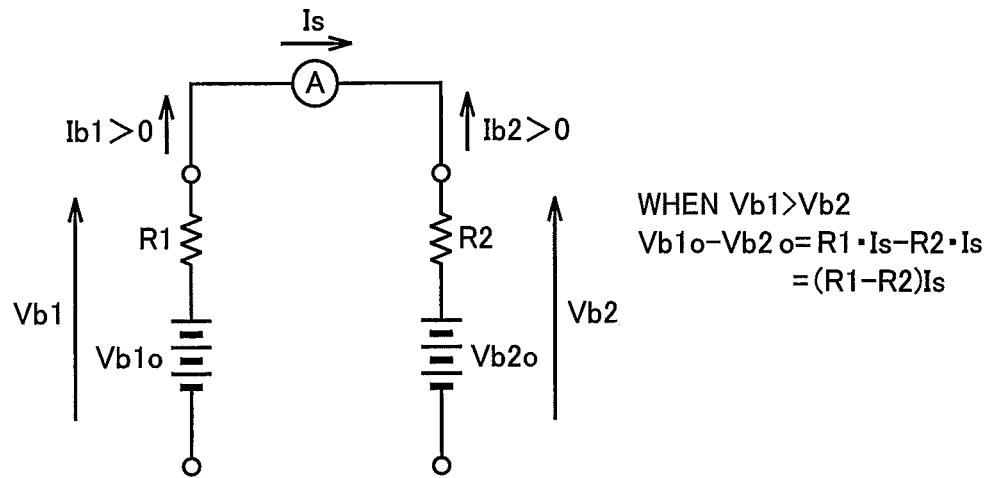
FIG. 9 schematically shows an electric current path formed between a first power storage device and a second power storage device.

FIG. 9 schematically shows the electric current path generated between first power storage device 4-1 and second power storage device 4-2. Referring to FIG. 9, output voltage Vb1 of first power storage device 4-1 can be represented by expression (1) with electromotive force Vb1*o*, internal resistance R1, and electric current value Ib1 of first power storage device 4-1.

$$Vb1=Vb1o-R1 \times Ib1 \qquad (1)$$

Likewise, output voltage Vb2 of second power storage device 4-2 can be represented by expression (2) with electromotive force Vb2*o*, internal resistance R2, and electric current value Ib2 of second power storage device 4-2.

$$Vb2=Vb2o-R2 \times Ib2 \qquad (2)$$

Here, as shown in FIG. 8, when the control mode of converters 6-1, 6-2 is switched to the electrically conductive mode, an electric current path constituted of positive line PL1, main positive line MPL, and positive line PL2 is generated between the positive electrode of first power storage device 4-1 and the positive electrode of second power storage device 4-2. Short-circuit current Is flowing in this electric current path can be represented by the following expression (3) from the above expressions (1) and (2).

$$Is=(Vb1o-Vb2o)/(R1-R2) \qquad (3)$$

As also clearly seen from expression (3), the direction (polarity) of short-circuit current Is varies depending on the magnitude relationship between respective electromotive forces of the power storage devices. Specifically, when electromotive force Vb1*o* is larger than electromotive force Vb2*o*, short-circuit current Is flows from first power storage device 4-1 toward second power storage device 4-2. In contrast, when electromotive force Vb2*o* is larger than electromotive force Vb1*o*, short-circuit current Is flows from second power storage device 4-2 toward first power storage device 4-1. Therefore, a current sensor used for detecting the direction of short-circuit current Is may be provided on the electric current path as shown in FIG. 9 to determine the magnitude relationship between electromotive forces Vb1*o*, Vb2*o* based on the detected value of the current sensor.

Here, as a current sensor shown in FIG. 9, one of output current detection units 10-1, 10-2 associated respectively with power storage devices 4-1, 4-2 for detecting the output currents of the associated power storage devices may be used. In the second embodiment, by way of example, the magnitude relationship between respective output voltages of the power storage devices is determined based on the direction (polarity) of the output current Ib1 detected by output current detection unit 10-1. In the following, it is supposed that the direction of output current Ib1 flowing from first power storage device 4-1 to positive line PL1 is defined as positive, and the direction of the output current flowing from positive line PL1 to first power storage device 4-1 is defined as negative.

Specifically, referring again to FIG. 7, converter ECU 30 acquires output current Ib1 from output current detection unit 10-1 in a predetermined period of step S14 (step S15), and then determines whether the acquired output current Ib1 is positive (step S16).

When output current Ib is positive (YES in step S16), converter ECU 30 determines that output voltage Vb1 of first power storage device 4-1 is larger than output voltage Vb2 of second power storage device 4-2. Converter ECU 30 then switches first converter 6-1 to the electrically conductive mode, and switches second converter 6-2 to the stop mode (step S17).

In contrast, when output current Ib 1 is zero or less (NO in step S16), converter ECU 30 determines that output voltage Vb1 of second power storage device 4-2 is equal to or larger than output voltage Vb2 of first power storage device 4-1. In this case, converter ECU 30 switches first converter 6-1 to the stop mode and switches second converter 6-2 to the electrically conductive mode (step S18).

As described above, in the second embodiment, when required electric power Ps becomes a low load, the converter associated with one of power storage devices 4-1 and 4-2 that has a higher output voltage is switched to the electrically conductive mode, while the converter associated with the other power storage device is switched to the stop mode, which is similar to the first embodiment. Thus, supply of electric power to drive force generation unit 2 is continued while one of converters 6-1, 6-2 stops performing the voltage converting operation, and accordingly a switching loss in supply of electric power from the associated power storage device to main positive line MPL and main negative line MNL can be reduced.

However, if the detected value (output current Ib 1) of output current detection unit 10-1 includes an error, the polarity of the detected value and that of the true output current may not be identical to each other. In such a case, the control mode of converters 6-1, 6-2 is switched based on the wrong detected value, resulting in occurrence of short-circuit current Is (FIG. 5) between first power storage device 4-1 and second power storage device 4-2.

In view of the above, the power supply system of the second embodiment is configured to provide a predetermined voltage difference, which is determined in accordance with an error that may be included in the detected value of output current detection unit 10-1, between respective power supply voltages of power storage devices 4-1, 4-2. Specifically, power storage devices 4-1, 4-2 are configured so that the power supply voltage of one of power storage devices 4-1, 4-2 is higher by a predetermined value than the power supply voltage of the other power storage device.

Figure 10:
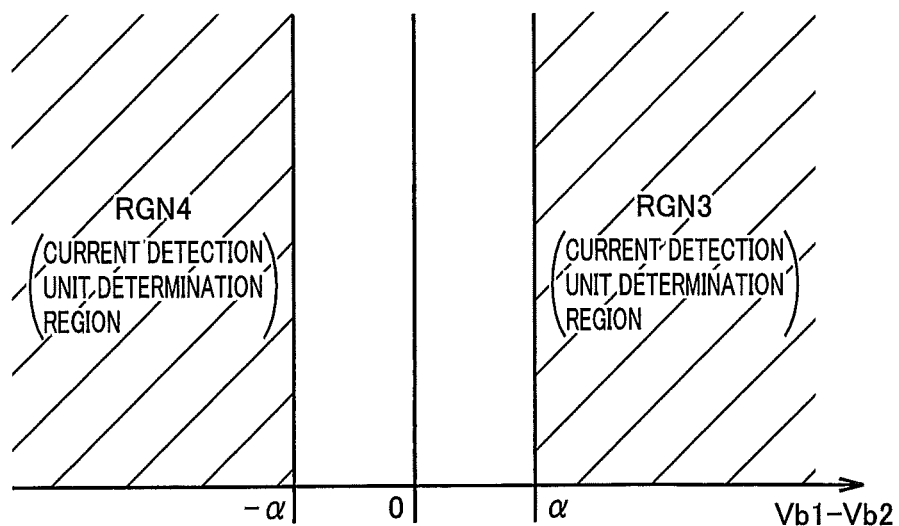
FIG. 10 is a diagram showing a range of a voltage difference between power storage devices that can be determined based on a detected value of an output current detection unit.

Here, the predetermined value of this configuration is determined so that a difference in power supply voltage between the power storage devices falls in one of regions RGN3 and RGN4 shown in FIG. 10. More specifically, FIG. 10 shows a range of the voltage difference (=Vb1−Vb2) between the power storage devices that can be determined based on the detected value of output current detection unit 10-1.

For example, it is supposed that output current detection unit 10-1 includes positive and negative maximum errors $\Delta I$. Then, when detected value Ib1 of output current detection unit 10-1 falls in the range of not less than −$\Delta I$ and not more than +$\Delta I$, the direction (polarity) of detected value Ib1 may not be identical to the direction (polarity) of the true output current. Therefore, if a comparison is made between respective output voltages of the power storage devices based on this detected value Ib1, the result of comparison should be in error.

FIG. 10 shows a voltage difference a between the power storage devices when a short-circuit current is generated that is almost the same as a positive maximum error +$\Delta I$ of output current detection unit 10-1 ($\alpha = \Delta I \times (R1-R2)$), and a voltage difference −$\alpha$ between the power storage devices when a short-circuit current is generated that is almost the same as negative maximum error −$\Delta I$. Then, the above-described error in the result of comparison occurs when the true voltage difference between the power storage devices falls in the voltage range defined by the two voltage differences $\alpha$, −$\alpha$. In other words, when the true voltage difference between the power storage devices is larger than voltage difference a (corresponding to region RGN3 in FIG. 10), or when the true voltage difference is smaller than voltage difference −$\alpha$ (corresponding to region RGN4 in FIG. 10), a comparison between the output voltages of the power storage devices can accurately be done without being influenced by the maximum error of output current detection unit 10-1.

Accordingly, in the second embodiment, the predetermined value is set larger than value α which is a voltage difference between the power storage devices into which maximum error ΔI of output current detection unit 10-1 is converted. Then, regardless of an error which may be included in the detected value of output current detection unit 10-1, the magnitude relationship between respective output voltages of the power storage devices obtained from detected value Ib1 is always identical to that of the true output voltages. Thus, occurrence of an error in the result of comparison between respective output voltages of the power storage devices is suppressed, and therefore generation of the short-circuit current between the power storage devices can be suppressed. Consequently, control for reducing an electric power conversion loss of the voltage conversion unit can stably be carried out.

Third Embodiment

Figure 11:
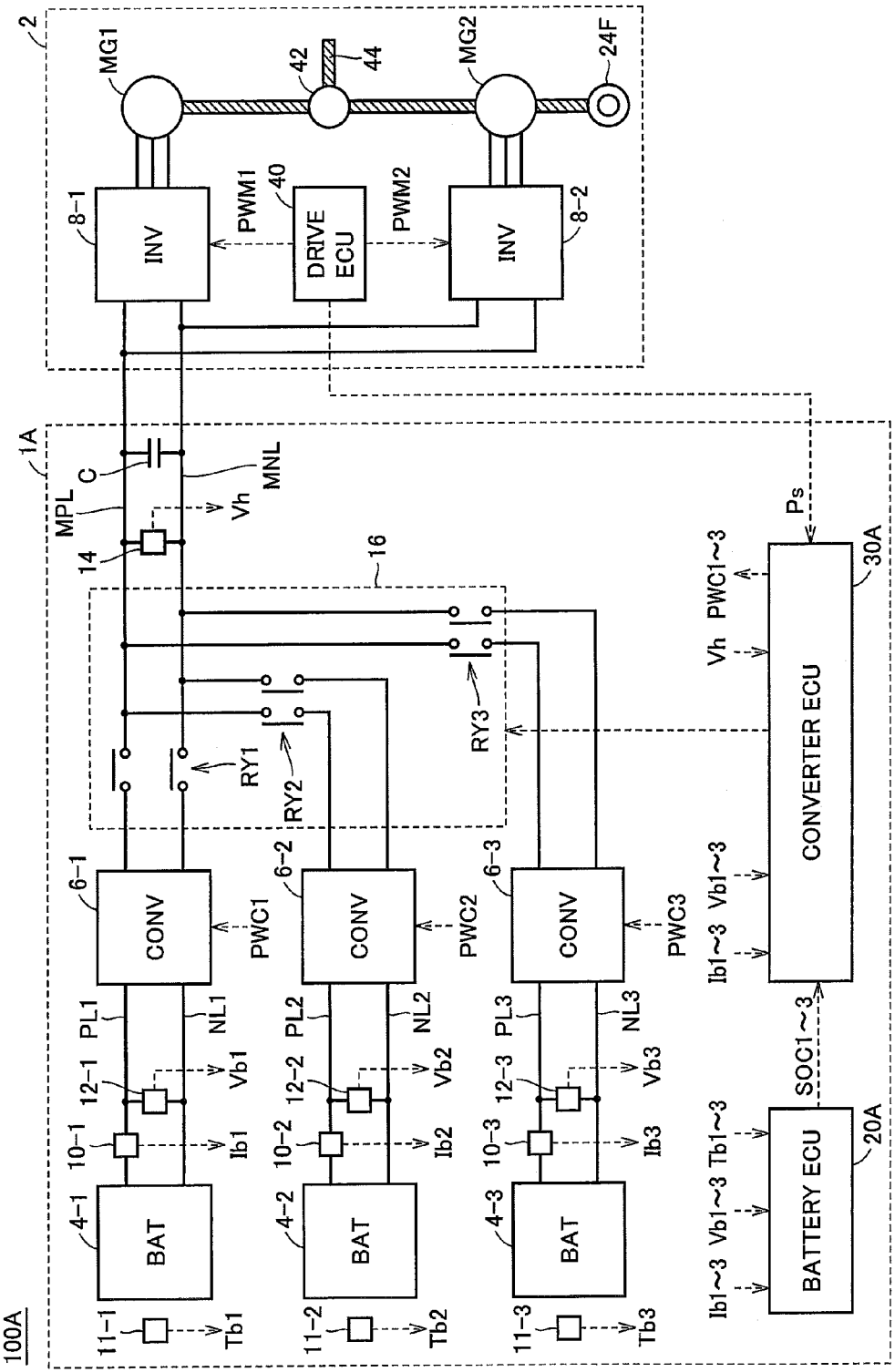
FIG. 11 is a schematic configuration diagram showing main components of a vehicle mounted with a power supply system according to a third embodiment of the present invention.

FIG. 11 is a schematic configuration diagram showing main components of a vehicle 100 mounted with a power supply system 1A according to a third embodiment of the present invention. Power supply system 1A of the third embodiment differs from power supply system 1 shown in FIG. 1 in that the former includes three power storage devices 4-1 to 4-3 instead of two power storage devices 4-1, 4-2.

Referring to FIG. 11, power supply system 1A includes a smoothing capacitor C, an input/output voltage detection unit 14, a first converter 6-1, a second converter 6-2, a third converter 6-3, output current detection units 10-1 to 10-3, output voltage detection units 12-1 to 12-3, temperature detection units 11-1 to 11-3, a converter ECU 30A, and a battery ECU 20A.

First converter 6-1, second converter 6-2, and third converter 6-3 are connected in parallel to each other to main positive line MPL and main negative line MNL. First converter 6-1 is provided between main positive line MPL and main negative line MNL, and first power storage device 4-1, and performs an electric power converting operation between first power storage device 4-1 and main positive line MPL and main negative line MNL, based on switching command PWC1 from converter ECU 30A. Second converter 6-2 is provided between main positive line MPL and main negative line MNL, and second power storage device 4-2, and performs an electric power converting operation between second power storage device 4-2 and main positive line MPL and main negative line MNL based on switching command PWC2 from converter ECU 30A. Third converter 6-3 is provided between main positive line MPL and main negative line MNL, and third power storage device 4-3, and performs an electric power converting operation between third power storage device 4-3 and main positive line MPL and main negative line MNL based on switching command PWC3 from converter ECU 30A.

A switch device 16 is provided between main positive line MPL and main negative line MNL and converters 6-1 to 6-3 and configured to be capable of electrically disconnecting one of converters 6-1 to 6-3 from main positive line MPL and main negative line MNL, following switching command SW from converter ECU 30A.

Specifically, switch device 16 includes system relays RY1 to RY3. System relay RY1 is disposed between first power storage device 4-1 and first converter 6-1. System relay RY2 is disposed between second power storage device 4-2 and second converter 6-2. System relay RY3 is disposed between third power storage device 4-3 and third converter 6-3. System relays RY1 to RY3 are shut off in response to switch command SW from converter ECU 30A.

Third power storage device 4-3, like first power storage device 4-1 and second power storage device 4-2, is a chargeable and dischargeable DC power supply. Output current detection unit 10-3 provided on positive line PL3 detects output current Ib3 relevant to input and output of third power storage device 4-2, and output voltage detection unit 12-3 connected between positive line PL3 and negative line NL3 detects output voltage Vb3 relevant to input and output of third power storage device 4-3. Further, temperature detection unit 11-3 disposed near a battery cell forming third power storage device 4-3 detects temperature Tb3 of third power storage device 4-3.

Battery ECU 20A calculates respective SOCs of the power storage devices based on temperatures Tb1 to Tb3 detected by temperature detection units 11-1 to 11-3, output currents Ib1 to Ib3 detected by output current detection units 10-1 to 10-3, and output voltages Vb1 to Vb3 detected by output voltage detection units 12-1 to 12-3.

Converter ECU 30A cooperates with battery ECU 20A and drive ECU 40 connected via a control line to control the voltage converting operation of converters 6-1 to 6-3 each so that required electric power Ps may be shared at a predetermined ratio between power storage devices 4-1 to 4-3. Specifically, based on respective detected values of output current detection units 10-1 to 10-3, output voltage detection units 12-1 to 12-3, and input/output voltage detection unit 14 as well as required electric power Ps, converter ECU 30A generates switching commands PWC1 to PWC3 for driving converters 6-1 to 6-3, respectively. Then, converter ECU 30A outputs generated switching commands PWC1 to PWC3 to converters 6-1 to 6-3 respectively to control converters 6-1 to 6-3.

Further, when required electric power Ps is a low load, converter ECU 30A generates switch command SW for electrically disconnecting one of converters 6-1 to 6-3 from main positive line MPL and main negative line MNL, and outputs the generated switch command to switch device 16. Then, respective control modes of the converters are switched so that one of the remaining two converters executes the voltage converting operation and the voltage converting operation of the other converter is stopped.

FIG. 12 is a flowchart showing a control structure of converter ECU 30A according to the third embodiment of the present invention. The flowchart shown in FIG. 12 can be implemented by executing a program stored in advance by converter ECU 30A.

Referring to FIG. 12, converter ECU 30A acquires required electric power Ps from drive ECU 40 (step S01), and determines whether or not required electric power Ps is larger than threshold value Pth (step S02). Namely, it is determined whether or not the required electric power is a high load.

When required electric power Ps is larger than threshold value Pth (YES in step S02), namely when required electric power Ps is a high load, converter ECU 30A sets first converter 6-1 in the voltage control mode (voltage step up) so that first converter 6-1 is caused to operate as "master", and sets second converter 6-2 and third converter 6-3 in the electric power control mode so that second converter 6-2 and third converter 6-3 are caused to operate as "slave" (step S03).

In contrast, when required electric power Ps is equal to or less than threshold value Pth (NO in step S02), namely when required electric power Ps is a low load, converter ECU 30A controls the transistors constituting respective upper arms of converters 6-1 to 6-3 so that they are simultaneously set in the ON state for a predetermined period (step S21). Thus, in the predetermined period, converters 6-1 to 6-3 are all controlled so that they are in the electrically conductive mode. Converter ECU 30A acquires output currents Ib1 to Ib3 in this predetermined period from output current detection units 10-1 to 10-3 respectively (step S22).

Based on acquired output currents Ib1 to Ib3, converter ECU 30A selects a converter associated with a power storage device with the output current of the negative direction (polarity), and then generates switch command SW for electrically disconnecting this converter from main positive line MPL and main negative line MNL to output the command to switch device 16. In this way, the system relay provided between this converter and main positive line MPL and main negative line MNL is shut off (step S23).

In this step S23, based on the polarity of the output current of each power storage device in a predetermined period, a power storage device having the lowest output voltage is selected from power storage devices 4-1 to 4-3. This is based on the fact that, in the predetermined period, an electric current path is formed between power storage devices 4-1 to 4-3 via main positive line MPL and main negative line MNL, and short-circuit current flows through this electric current path toward a power storage device with the lowest output voltage, from the remaining two power storage devices.

Next, converter ECU 30A performs the operations in the following steps S24 to S27 to select a converter associated with a power storage device with a relatively higher output voltage from the remaining two converters and causes the converter to perform the voltage converting operation. The operations in steps S24 to S27 are substantially the same as those in steps S14 to S18 of the flowchart in FIG. 7.

Specifically, converter ECU 30A first controls the transistors constituting the upper arms of the remaining two converters associated with the remaining two power storage devices so that the transistors are simultaneously in the ON state for a predetermined period (step S24). In this predetermined period, when converter ECU 30A acquires output current Ib of one of the remaining two power storage devices from the associated output current detection unit (step S25), converter ECU 30A determines the magnitude relationship between respective output voltages of the remaining two power storage devices based on the polarity of acquired output current Ib (step S26).

Then, converter ECU 30A switches the converter associated with one of the power storage devices that has a higher output voltage to the electrically conductive mode, and switches the converter associated with the other power storage device to the stop mode (step S27).

As described above, according to the third embodiment, when required electric power Ps becomes a low load, a converter associated with a power storage device with a highest output voltage, among power storage devices 4-1 to 4-3, is switched to the electrically conductive mode, and the converters associated with the remaining two power storage devices are switched to the stop mode. Thus, supply of electric power to drive force generation unit 2 is continued while the converters associated with the remaining power storage devices stop performing the voltage converting operation. Accordingly, a switching loss in electric power supply from the remaining power storage devices to main positive line MPL and main negative line MNL can be reduced. Therefore, even if electric power supply from only one power storage device is accompanied by a relatively large value of electric current flowing in the associated converter, occurrence of an unwanted loss can be suppressed.

In power supply system 1A of the third embodiment, based on the polarity of output currents Ib to Ib detected by output current detection units 10-1 to 10-3 associated respectively with power storage devices 4-1 to 4-3, a converter associated with a power storage device of a highest output voltage is selected. Therefore, if an error occurs to the result of comparison between respective output voltages of the power storage devices, due to an influence of errors included in the detected values of output current detection units 10-1 to 10-3, it is possible that short-circuit current is generated between the power storage devices.

Therefore, in the third embodiment as well, a predetermined voltage difference is defined that is determined based on errors which may be included in the detected values of the output current detection units, between respective power supply voltages of power storage devices 4-1 to 4-3. By way of example, second power storage device 4-2 is configured to have a power supply voltage higher by a predetermined value than third power storage device 4-3. Further, first power storage device 4-1 is configured to have a power supply voltage higher by a predetermined value than second power storage device 4-2. At this time, the predetermined value is set to a value higher than value α which is a voltage difference between the power storage devices into which maximum error ΔI of the output current detection units is converted, as described in connection with FIG. 10. As a result, the magnitude relationship between respective output voltages of the power storage devices that is obtained from the detected values is always the same as the magnitude relationship between the true output voltages, regardless of errors that may be included in the detected values of the output current detection units. Thus, occurrence of an error to the result of comparison between the output voltages of the power storage devices is suppressed, and generation of short-circuit current between the power storage devices can be suppressed.

As described above, in accordance with the third embodiment of the present invention, even when the power supply system is configured to include three or more power storage devices and converters, the effects similar to those of the first and second embodiments can be achieved. Therefore, in accordance with required electric power of the load device, the number of converters and power storage devices can be designed relatively freely. Thus, a power supply system capable of supplying electric power to load devices of various sizes and types, as well as a vehicle equipped with the power supply system can be implemented.

In connection with the above embodiments each, it has been described that the drive force generation unit including two motor generators is used as an example of the load device. The number of motor generators, however, is not limited. Further, the load device is not limited to the drive force generation unit generating a force for driving a vehicle, and may be a device which only consumes electric power or a device which consumes electric power and is also capable of generating electric power.

Further, in connection with the above embodiments each, the description has been given of a so-called series/parallel hybrid vehicle, as an example of the vehicle equipped with the power supply system, in which power split device 42 is used to distribute the motive power of the engine to motor generator MG1 and wheels. The present invention, however, is also applicable to a so-called series hybrid vehicle in which the motive power of the engine is used only for generating electric power by motor generator MG1, and the drive force for the vehicle is generated using motor generator MG2 only.

It should be construed that embodiments disclosed herein are by way of illustration in all respects, not by way of limitation. It is intended that the scope of the present invention is defined by claims, not by the above description, and encompasses all modifications and variations equivalent in meaning and scope to the claims.

INDUSTRIAL APPLICABILITY

The present invention is applicable to a power supply system having a plurality of power storage devices as well as a vehicle equipped with the power supply system.

REFERENCE SIGNS LIST 1, 1A power supply system; 2 drive force generation unit; 4-1 first power storage device; 4-2 second power storage device; 4-3 third power storage device; 6-1 first converter; 6-2 second converter; 6-3 third converter; 8-1 first inverter; 8-2 second inverter; 10-1 to 10-3 output current detection unit; 11-1 to 11-3 temperature detection unit; 12-1 to 12-3 output voltage detection unit; 14 input/output voltage detection unit; 16 switch device; 40-1, 40-2 chopper circuit; 42 power split device; 100 vehicle; C, C1 smoothing capacitor; D1A, D1B diode; 20, 20A battery ECU; 30, 30A converter ECU; 40 drive ECU; L1, L2 inductor; MG1, MG2 motor generator; MNL main negative line; MPL main positive line; NL1 to NL3 negative line; PL1 to PL3 positive line; Q1A, Q1B, Q2A, Q2B transistor; RY1 to RY3 system relay

The invention claimed is:

1. A power supply system having a plurality of power storage devices each configured to be chargeable and dischargeable, comprising:
   a pair of electric power lines electrically connected to a load device;
   a plurality of voltage conversion units provided respectively between said plurality of power storage devices and said pair of electric power lines, and each configured to perform a voltage converting operation between said pair of electric power lines and associated one of said power storage devices;
   a plurality of voltage detection units associated respectively with said plurality of power storage devices for detecting respective output voltages of said associated power storage devices, respectively; and
   a control device controlling said plurality of voltage conversion units in accordance with required electric power which is required by said load device, wherein
   said plurality of power storage devices include first and second power storage devices that are configured so that one of the first and second power storage devices has a power supply voltage higher by a first predetermined value than the other power storage device, and
   said first predetermined value is determined in accordance with errors which may be included in detected values of said plurality of voltage detection units.

2. The power supply system according to claim 1, wherein when the required electric power required by said load device is not more than a threshold value, said control device controls first and second voltage conversion units included in said plurality of voltage conversion units, based on output voltages of said plurality of power storage devices detected by said plurality of voltage detection units, so that a voltage converting operation is executed by one of the first and second voltage conversion units that is associated with one of said power storage devices that has a higher output voltage than the other, and a voltage converting operation by the other of the first and second voltage conversion units is stopped.

3. The power supply system according to claim 2, wherein said first predetermined value is determined so that said first predetermined value is larger than a sum of errors that may be included in detected values of said voltage detection units associated with said first and second power storage devices respectively.

4. The power supply system according to claim 2, wherein said plurality of voltage conversion units each include:
   a switching device connected in series with an inductor and disposed between one electric power line of said pair of electric power lines and one electrode of associated one of said power storage devices; and
   a line for electrically connecting the other electric power line of said pair of electric power lines and the other electrode of said associated power storage device, and
   said control device keeps said switching device in an ON state in said voltage conversion unit which is executing the voltage converting operation.

5. A power supply system having a plurality of power storage devices each configured to be chargeable and dischargeable, comprising:
   a pair of electric power lines electrically connected to a load device;
   a plurality of voltage conversion units provided respectively between said plurality of power storage devices and said pair of electric power lines, and each configured to perform a voltage converting operation between said pair of electric power lines and associated one of said power storage devices;
   a plurality of current detection units associated respectively with said plurality of power storage devices for detecting respective electric currents of said associated power storage devices, respectively; and
   a control device controlling said plurality of voltage conversion units in accordance with required electric power which is required by said load device, wherein
   said plurality of power storage devices include first and second power storage devices that are configured so that one of the first and second power storage devices has a power supply voltage higher by a second predetermined value than the other power storage device, and
   said second predetermined value is determined in accordance with errors which may be included in detected values of said plurality of current detection units.

6. The power supply system according to claim 5, wherein when the required electric power required by said load device is not more than a threshold value, said control device controls said plurality of voltage conversion units so that said pair of electric power lines and associated said power storage devices are electrically conductive for a predetermined period, and controls first and second voltage conversion units included in said plurality of voltage conversion units, based on an electric current which is detected in said predetermined period by a first current detection unit included in said plurality of current detection units and of associated one of said power storage devices, so that a voltage converting operation is executed by one of the first and second voltage conversion units that is associated with one of said power storage devices that has a higher output voltage than the other, and a voltage converting operation by the other of the first and second voltage conversion units is stopped.

7. The power supply system according to claim 6, wherein based on a polarity of the electric current of said associated power storage device that is detected by said first current detection unit in said predetermined period, said control device selects said voltage conversion unit associated with said power storage device that has a higher output voltage, and said second predetermined value is determined so that said second predetermined value is larger than a value determined by converting an error which may be included in a detected value of said first current detection unit into a voltage difference between an output voltage of said first power storage device and an output voltage of said second power storage device.

8. The power supply system according to claim 6, wherein said plurality of voltage conversion units each include:
- a switching device connected in series with an inductor and disposed between one electric power line of said pair of electric power lines and one electrode of associated one of said power storage devices; and
- a line for electrically connecting the other electric power line of said pair of electric power lines and the other electrode of said associated power storage device, and said control device keeps said switching device in an ON state in said voltage conversion unit which is executing the voltage converting operation.

9. A vehicle comprising:
a power supply system as recited in claim 1; and
a drive force generation unit serving as said load device to generate a drive force for said vehicle from electric power received from said power supply system.

* * * * *

UNITED STATES PATENT AND TRADEMARK OFFICE
CERTIFICATE OF CORRECTION

PATENT NO. : 8,598,734 B2  
APPLICATION NO. : 13/259416  
DATED : December 3, 2013  
INVENTOR(S) : H. Kusumi Page 1 of 1

It is certified that error appears in the above-identified patent and that said Letters Patent is hereby corrected as shown below:

In the Specification

At column 9, line 36, change "Phi" to -- Pb1 --.

At column 12, line 60, change "difference. (=Vb1-" to -- difference (=Vb1- --.

At column 13, line 17, change "sum 13" to -- sum β --.

At column 13, line 25, change "sump" to -- sum β --.

At column 16, line 54, change "difference a" to -- difference α --.

Signed and Sealed this  
Thirteenth Day of May, 2014

Michelle K. Lee  
*Deputy Director of the United States Patent and Trademark Office*